May 19, 1953 P. KNEER 2,639,024
CONVEYER
Filed Feb. 27, 1948 2 Sheets-Sheet 2
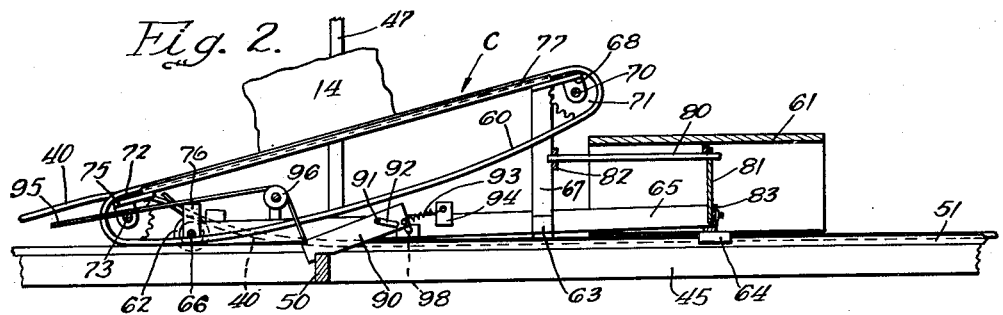
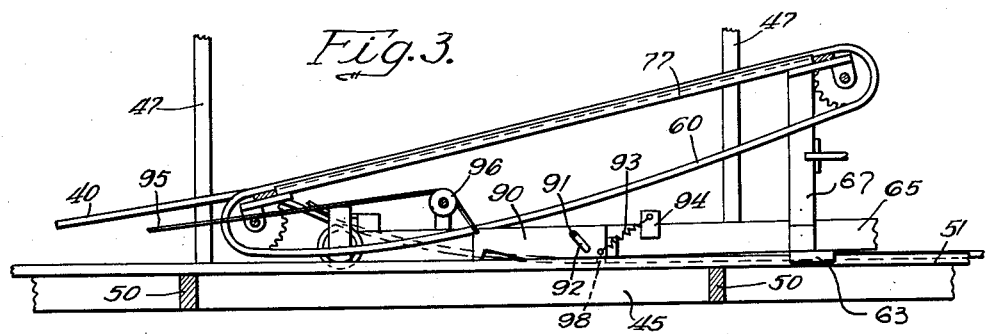
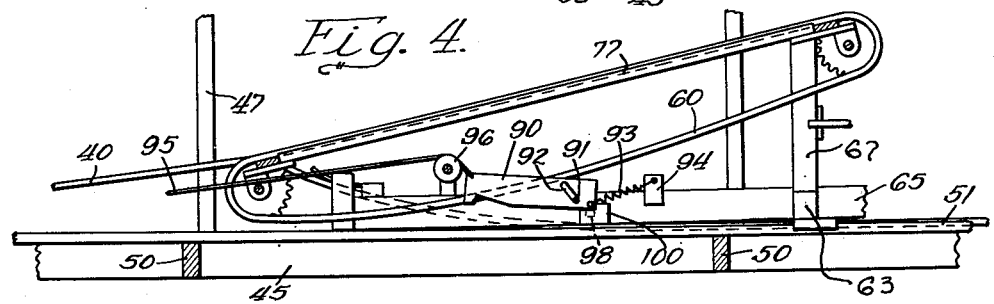
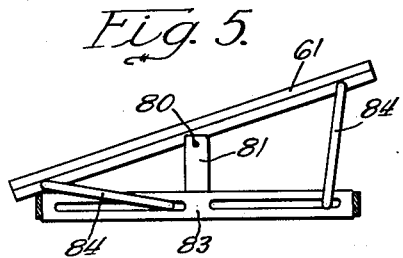
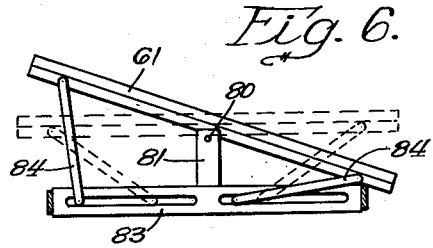
Inventor:
Paul Kneer
By
Watson D. Harbaugh
Atty.

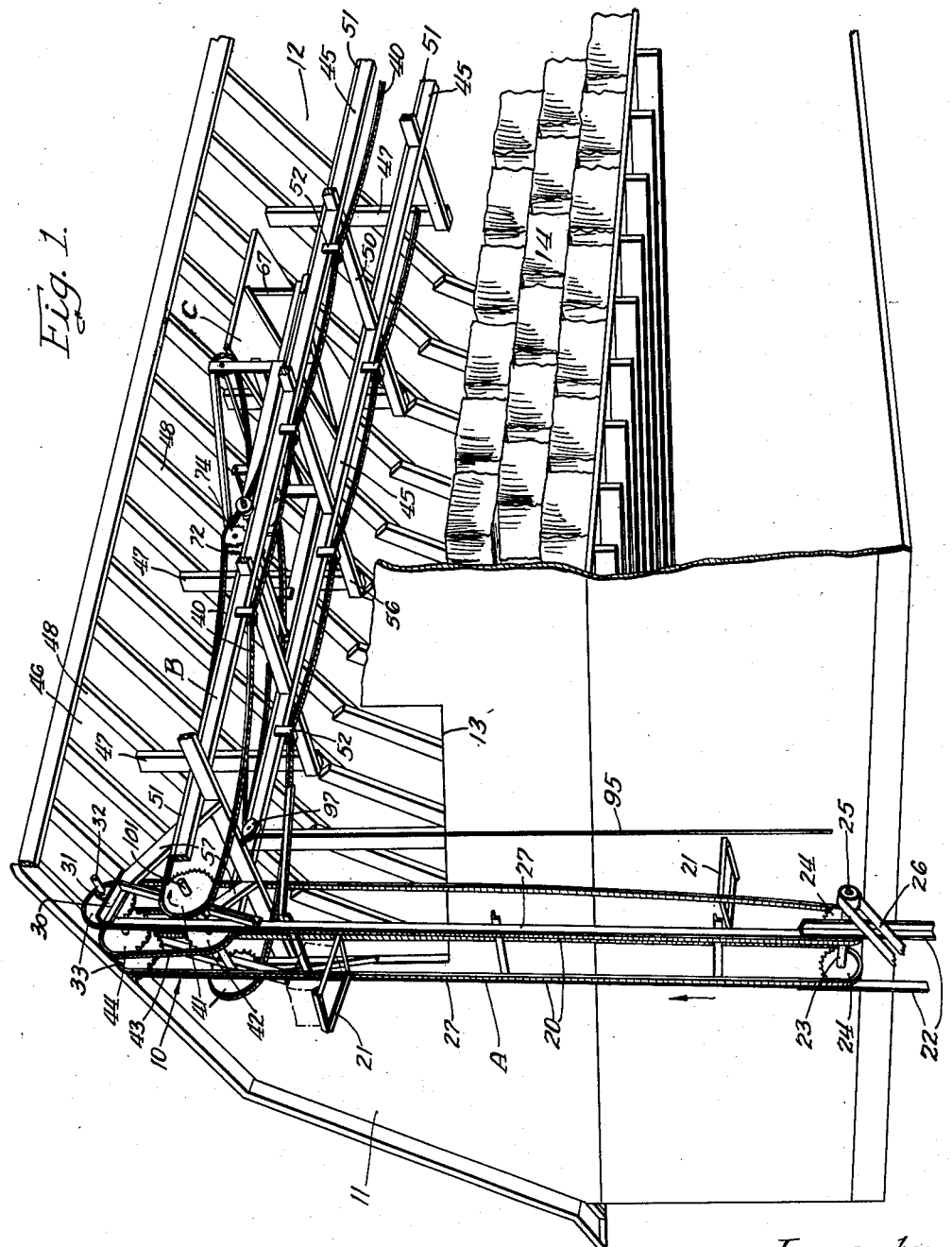

Patented May 19, 1953

2,639,024

UNITED STATES PATENT OFFICE 2,639,024

CONVEYER

Paul Kneer, Monica, Ill.

Application February 27, 1948, Serial No. 11,372

5 Claims. (Cl. 198—89)

This invention relates generally to conveyors and more particularly to an improved conveyor for raising and horizontally transferring materials.

The conveyor of this invention is intended primarily for moving large cumbersome articles such as bales of hay, and it is, therefore, described in the following specification as a hay bale conveyor although it is not intended that the invention is limited to such applications. The conveyor of this invention may be readily adapted to accommodate other rectangular objects such as packing boxes or even modified to convey other substances such as corn, grain, etc. by substituting suitable belting for the conveying chains.

The problem of transferring hay into a storage barn is twofold. First the hay must be lifted from the wagon or other vehicle to the mow level of the barn, and then it must be transferred horizontally to the final storage position in the barn. The problem has been partially solved by baling the hay prior to storage for ease in handling, but heretofore no fully satisfactory conveying apparatus has been provided for moving the bales.

The current common practice is to lift each bale, using a block and tackle supported from an extension of the barn ridge pole to the top of the barn, and then to move the bale inwardly by means of an overhead monorail conveyor to the final storage position. However, this method is not satisfactory in that each bale must be handled individually and only a single bale at a time may be in transit from the wagon to the loft.

One object of this invention is to provide a conveyor which will continuously handle a plurality of bales at the same time and distribute them at any one of a plurality of stations selectively and thus increase the number of bales which may be stowed in a given time.

Another object is to provide a conveyor which will automatically transport bales from a point on the ground to selected parts of the mow.

Another object is to provide a conveyor which may be readily adjusted to deliver bales to different parts of the barn.

Another object is to provide a conveyor which may be easily employed to distribute bales throughout the mow starting at one end and working to the other, the distributing portions of the mechanism being moved successively from one position to the next by the power supplied to the conveyor.

Another object is to provide a conveyor with which a minimum of manual labor is required.

A further object is to provide a conveying apparatus comprising an elevator, a horizontal conveyor, a distributing element which can be located at any selected position and an inclined conveyor for lifting the articles from the horizontal conveyor to the distributing element all powered by a single prime mover located on the ground or at any shaft outside or inside the mow, power being transmitted through the conveying chains to all other shafts.

Other and additional objects and advantages of this invention will of course present themselves to those familiar with the art on reading the following specification in conjunction with the drawings and the appended claims.

In the drawings:

Fig. 1 is a cutaway perspective view of a barn equipped with the conveyor of this invention;

Fig. 2 is an enlarged section showing the distributor and inclined conveyor assembly;

Fig. 3 is an enlarged section showing the inclined conveyor in another position;

Fig. 4 is an enlarged section showing the inclined conveyor as it is pulled backwardly;

Fig. 5 is an end view of the distributor table; and

Fig. 6 is an end view of the table tilted in the opposite direction.

The preferred embodiment of the conveyor 10 of this invention is shown installed in a barn 11 in Fig. 1. The barn 11 is of conventional construction having an overhead loft or haymow 12 and an access opening 13 to the mow at one end. Baled hay 14 is shown stacked in the mow 12.

For purposes of description the conveyor, although an integral unit, will be described as three subassemblies. The vertical elevator A, the horizontal conveyor B, and the distributor assembly C.

*The elevator assembly*

This assembly A comprises a pair of identical endless chains 20, a plurality of platforms 21 attached to the chains, and the various supporting and driving elements for the chains 20. The lower end of the elevator assembly A is secured to a pair of angle iron posts 22 extending into the ground and preferably received in concrete foundations (not shown). These posts support a drive shaft 23 which carries two drive sprockets 24 for the chains 20. The end of the shaft 23 which projects beyond the posts 22 is provided with drive pulley 25 driven by a belt 26. This belt may extend to the power take-off shaft on a tractor (not shown), a gasoline engine, or any other suitable prime mover. Motor or other power drives could be similarly applied at shaft 101, 32, or the shaft (not shown) located at the far end of the mow which carries the other end of the chains 40.

From the posts 22 a pair of chain supporting rails 27, preferably formed of angle bars, extend upwardly the length of the assembly A. The upper ends of the rails 27 are attached to a pair of horizontal bearing support bars 30 which carry bearing blocks 31 supporting the shaft 32 for the upper sprockets 33. The chains 20 extend upwardly along the rails 27 over the sprockets 33 and downwardly on the back side to the lower sprockets 24.

Thus when power is supplied through the belt 27, turning the shaft 23 and sprockets 24, the platform 21 on the outside moves upwardly and the platform 21 on the back side moves downwardly and a continuously moving elevator results. When each platform 21 reaches the top sprockets 33 it is rotated through 180° and moves downwardly on the rear side to again be rotated at the bottom sprockets 24 before starting up again.

The horizontal conveyor

The horizontal conveyor assembly B comprises another pair of endless chains 40 which extend horizontally from a pair of sprockets 41 located at the top of the elevator A to a second pair (not shown) at the far end of the barn 11 and return. The drive sprockets 41 are driven by the elevator mechanism A by means of a third sprocket 42 mounted on the shaft 101 which supports the sprockets 41. A short endless chain 43 couples this sprocket 42 to another sprocket 44 carried by the shaft 32.

The chains 40 of the horizontal conveyor assembly B are supported by a pair of horizontal rails 45 which are suspended from the roof 46 of the barn 11 by vertical beams 47 secured to the rafters 48. These vertical beams 47 in turn support horizontal crossbeams 50 which carry the rails 45.

The top face of each rail 45 is provided with a shallow channel member 51 in which rides the top portion of each of the chains 40. These channels 51 perform the dual function of providing a support for the chain 40 and also serve as supports along which the distributor assembly C may move. The channels 51 are of such depth that the chain 40 projects beyond them in order that bales 40 will be supported on the chain rather than on the edges of the channels 51. The returning portion of chain 40 is kept from sagging by U-shaped members 52 attached to the lower sides of the rails 45 at intervals.

Since the horizontal conveyor B is directly linked to the elevator A at all times, whenever the elevator A is operated the pair of chains 40 is also driven and serves to move bales 14 inwardly from the top of the elevator A into the barn 11, the bales 14 being lifted to the top of the elevator A on the moving platform 21 and deposited on the chains 40. Two supporting members 57 attached to the top of the elevator A form a slide down which the bales 14 may slide from the elevator A to the chains 40.

The distributor assembly

This assembly C is best shown in Fig. 2 and comprises a pair of endless chains 60, a tiltable distributor platform 61, and the supporting structure therefor.

The assembly C is supported on the channels 51 which form the tops of the rail 45, a pair of rollers 62 and four shoes (indicated at 63 and 64) being provided for this purpose. The shoes 63 and 64 are provided with internal shoulders which ride on the sides of the channels 51 and hold the shoes away from the chains 40 while the rollers 62 are disposed beneath the chains 40 and, therefore, may rest directly on the channels.

A pair of longitudinal bars 65 extend from the axle 66 of the rollers 62 to the shoes 63 and together with a pair of uprights 67 form a framework for the inclined conveyor portion of the assembly C. On the top end of each of the uprights 67 a bearing bracket 68 is provided which supports a shaft 70 carrying a pair of sprockets 71. Each inclined conveyor chain 60 passes around one of these sprockets and the corresponding one of a pair of sprockets 72 at the opposite end. The sprockets 72 are supported on a shaft 73 which also carries another pair of sprockets 74 (Fig. 1), all sprockets being rigidly attached to the shaft so that rotation of one independently of the others is impossible.

The shaft 73 is supported in a pair of bearing brackets 75 which are attached to the bearings 76 which carry the shaft 66 so that the lower end of the inclined conveyor is rigidly fixed to the ends of the bars 65. Additional rigidity is also obtained by employing a pair of channel members 77 which extends from the brackets 68 to the brackets 75 and serves to support the lengths of chain 60. These channels 77 are similar to those employed on top of the rails 45 for supporting the horizontal conveyor chains 40.

The distributor table 61 is pivotally supported on shaft 80 carried by an upright member 81 and a crossbar 82 connecting the members 67. The member 81 is in turn carried by a crossbar 83 attached to the ends of the bars 65 and to a pair of shoes 84 which rides on the channel 51 similarly to the shoes 63. The crossbar 83 is slotted to receive pins in the lower ends of the support bars 84. Thus the table may be supported in either of the positions shown in Figs. 5 and 6 in order to transfer bales 14 to either side of the barn 11 as they fall off of the inclined conveyor chains 60.

The operation of the distributor and inclined conveyor assembly is as follows: Assuming that the elevator A has been placed in operation, the horizontal conveyor chains 40 are also moving, the upper portions moving along the rails 45 away from the elevator A. Since these chains 40 pass over the sprockets 74 these sprockets are rotated in the clockwise direction. The adjacent sprockets 72, which are directly connected to the sprockets 74, are also rotated moving the inclined conveyor chain 60 in the same direction and at the same speed as the horizontal chains 40.

Thus after a bale of hay is lifted over the top of the elevator A it slides down the members 57 onto the chain 40 and is carried to the lower end of the inclined conveyor which also has a moving chain 60. Since the chains 40 pass over the sprockets 74 which are the same height as the sprockets 72, the bale is transferred to the inclined conveyor. The bale is carried by the chain 60 up the inclined conveyor to the end and is dropped onto the table 61, sliding off to either side of the barn 11 so that it may be easily stacked in the desired spot with a minimum of manual labor.

Horizontal shifting of the distributor assembly

The assembly C, because of the manner in which it is driven tends to move to the rear end of the barn when the conveyor is operating. Consequently, a locking arrangement as shown in Figs. 2, 3 and 4 is provided to control the movement of this element along the rails 45.

A latch 90 is attached to a pin 91, the pin being headed and extending through a slot 92 in the bar 90. Thus the latch may be moved longitudinally the length of the slot 92 or rotatively about the pin 91. The pin 91 is preferably secured to one of the side bars 65 but if desired it may be supported on a central member (not shown) paralleling the side bars 65.

A tension spring 93 connects one end of the latch to a projection 94 on the bar 65 so as to urge the latch bar 90 to the position shown in Fig. 2. When in this position the notched portion of the latch 90 extends downwardly to catch on one of the cross members 50 and prevent movement of the assembly C along the rails 45.

In order to unlatch the assembly C and permit movement farther into the barn, a rope 95 is provided. This rope passes over a sheave wheel 96 and extends through a block 97 (Fig. 1) to a point on the ground at the base of the elevator A. This rope 95 serves the dual purpose of unlatching the latch bar 90 and providing a means for pulling the assembly back towards the elevator A. When the rope 95 is pulled a small distance, the latch bar assumes the position shown in Fig. 3, being merely rotated with respect to the bar 65, and lifting the notched portion of the latch 90 free of the cross member 50 and permits movement of the assembly C with the chains 40. Ordinarily the frictional drag exerted by the chains 40 in passing over the sprockets 74 and the guide plate portions of the members 75 is sufficient to move the assembly C along the rails 45, but in order to insure positive action an offset projection 98 on the back side of the latch 90 is provided. This projection 98 is offset so as to be on the opposite side of the bar 65 from the latch 90 passing through a cutaway portion 100 in the bar 65 so as to engage the chains 40. When the rope 95 is pulled a short distance and the latch 90 is in the position shown in Fig. 3, the projection 98 is moved downwardly to engage a link of the chain 40. Thus when the latch 90 is in the position shown the assembly C is positively linked to the moving chain and the assembly will move along with the chain 40. When it is desired to stop this motion the tension on the rope 95 is relaxed and the spring 93 returns the latch 90 to the position shown in Fig. 2, the notched portion catching on the next in line crossbar 50 arresting movement of the assembly C.

To move the assembly C toward the elevator A it is only necessary to pull on the rope 95 with greater force. When this is done the latch 90 moves into the position shown in Fig. 4. The greater tension overcomes the force of the spring 93 and causes the latch 90 to move longitudinally with respect to the pin 91. This lifts the projection 98 free of the chain 40 and permits the assembly C to be drawn towards the elevator, the tension force on the rope 95 being transferred to the assembly through the pin 91.

Since the rope 95 extends from the open door 13 to the ground it is an easy matter to position the assembly C from either the ground level or from the mow floor, the single rope 95 being the only control means and the assembly C being movable in one direction by a light pull on the rope 95 and in the other by a heavy pull.

When the assembly reaches the far end of the barn, one of the teeth of the sprocket wheel (not shown) for the chain 40 on engaging the link of the chain in which the projection is received forces the projection out of engagement with the chain so that it is impossible to move the assembly C under power beyond a certain point and damage either the conveyor or barn structure.

Another advantage of the conveyor of this invention arises out of the fact that it is impossible to inadvertently cause a bale to be dropped onto the distributor table from the inclined conveyor while the assembly C is in motion. Thus a bale cannot be inadvertently dropped on the operator or become caught on a crossbar 50. This is due to the fact that motion of the inclined conveyor chains 60 ceases when the assembly is moved with the chain 40.

The preferred method of using the conveyor of this invention to fill a barn with baled hay has been found to be as follows: The assembly C is first pulled to a position adjacent the elevator A and the tension on the rope 95 is relaxed, causing the latch 90 to lock on the first crossbar 50. The prime mover is then coupled to the conveyor and started. Bales are placed on the elevators and hoisted to the mow. When sufficient bales have been deposited on one side, the table 61 is inclined in the opposite direction until this side is filled. The rope 95 is then pulled slightly and the assembly C is moved to the next crossbar 50 and again both sides are filled, reversing the table as before. This procedure is followed, moving from crossbar 50 and reversing the table until the barn 11 is filled, a minimum of manual effort being expended either to transport the bales 14 or move the assembly C.

In some instances it has been found desirable to eliminate the latch bar arrangement for locking the assembly C and merely secure the rope 95 to the assembly C. When this is done a cleat arrangement is usually provided so that the free end of the rope may be tied to position the table at a desired point.

This modification as wel las other changes and modifications of the apparatus of this invention, such as will present themselves to those familiar with the art, may be made without departing from the spirit of this invention, whose scope is defined by the following claims.

What is claimed is:

1. In a device of the class described a horizontal rail, a stationary element attached to said rail, an endless moving chain supported on the top of said rail, a conveyor assembly having a frame movably mounted on said rail, a pivoted latch member carried by said frame, means on said latch for engaging said stationary element in one rotative position to prevent movement of said assembly, and a projection on said latch for engaging said moving chain in a second rotative position of the latch to lock said assembly to said chain and move it with respect to said rail.

2. In a device of the class described, an endless moving chain, a conveyor assembly mounted for movement along the path of said chain, a plurality of stationary elements spaced along said path, a pivoted latch member associated with said conveyor assembly, means on said latch member for engaging any one of the plurality of stationary elements in one position of the member to prevent movement of the assembly along said path, and a second means upon said latch member for engaging a link of said moving chain when said latch member is moved to a second position to move said assembly along the path of said chain.

3. In combination an endless moving chain traveling along a path, a movable element mounted so as to be freely movable along said path, a latch member pivotally supported on said element at a point proximate to said chain, a plurality of stationary elements disposed in spaced relationship along said path, means on said latch member for engaging said stationary elements to prevent movement of the movable element in the direction said chain is moving when the member is in one rotative position, and projection means on said member for engaging a link of said chain to transmit motion of the chain to the movable element when the member is in the second rotative position.

4. In combination a movable element freely movable along a predetermined path, an endless moving chain traveling along a path parallel and in close proximity to the first mentioned path, a plurality of stationary elements disposed at spaced points along the path, a pivoted member supported on said movable element in close proximity to said movable chain, means on said member for engaging said stationary elements to check motion of said movable element along the path, and a second means on said member for engaging a link of said chain to move said movable element.

5. The combination called for in claim 2 in which said latch member is movable to a third position to clear said stationary elements and chain links, and including a manually controlled means secured to said latch member to move said latch into said third position and draw the conveyor assembly in a direction along said path opposite to the direction of movement of the chain.

PAUL KNEER.

References Cited in the file of this patent

UNITED STATES PATENTS

| Number | Name | Date |
|---|---|---|
| 230,144 | Merry | July 20, 1880 |
| 585,221 | McCabe et al. | June 29, 1897 |
| 649,365 | Scott | May 8, 1900 |
| 745,031 | Acklin | Nov. 24, 1903 |
| 758,875 | Ticknor et al. | May 3, 1904 |
| 1,096,932 | McClellon | May 19, 1914 |
| 1,249,305 | Black | Dec. 11, 1917 |
| 1,575,655 | Stinson | Mar. 9, 1926 |
| 2,063,431 | Grayson et al. | Dec. 8, 1936 |